United States Patent [19]
DeFrancq

[11] Patent Number: 5,542,477
[45] Date of Patent: Aug. 6, 1996

[54] FRONT LIFTING DEVICE FOR AGRICULTURAL TRACTOR OR THE LIKE

[76] Inventor: Hubert DeFrancq, 6, rue du Moulin, 51140, Lonchery-sur-Vesle, France

[21] Appl. No.: 295,862

[22] PCT Filed: Mar. 9, 1993

[86] PCT No.: PCT/FR93/00228

§ 371 Date: Sep. 7, 1994

§ 102(e) Date: Sep. 7, 1994

[87] PCT Pub. No.: WO93/17542

PCT Pub. Date: Sep. 16, 1993

[30] Foreign Application Priority Data

Mar. 12, 1992 [FR] France .................. 92 02952

[51] Int. Cl.$^6$ .................................. A01B 59/06
[52] U.S. Cl. .............. 172/439; 172/273; 414/695.5
[58] Field of Search .................. 172/439, 272, 172/273, 274, 275, 2, 443; 37/403, 382; 414/686, 694, 695.5; 56/13.6, 192

[56] References Cited

U.S. PATENT DOCUMENTS

| | | | |
|---|---|---|---|
| 2,869,654 | 1/1959 | Hershman | 172/439 |
| 3,065,977 | 11/1962 | Virtue et al. | 172/439 |
| 3,145,781 | 8/1964 | Rogler | 172/439 |
| 3,561,789 | 2/1971 | Stikeleather et al. | 172/272 |
| 3,572,759 | 3/1971 | Baugh et al. | 172/439 X |
| 4,194,756 | 3/1980 | Van der Lely | 172/439 |
| 4,216,975 | 8/1980 | Schafer | 172/439 |
| 4,424,870 | 1/1984 | Weiss | 172/439 X |
| 4,519,623 | 5/1985 | Orthman | 172/439 |
| 4,535,859 | 8/1985 | Van der Lely | 172/439 X |
| 4,542,913 | 9/1985 | Giesmann | 172/272 |
| 4,659,102 | 4/1987 | Stuhrmann et al. | 172/275 X |
| 4,681,336 | 7/1987 | Kryscyk | 172/439 X |
| 4,715,770 | 12/1987 | Kryscyk | 172/443 X |
| 4,909,331 | 3/1990 | Defranco | 172/2 |
| 4,934,471 | 6/1990 | Tanaka et al. | 172/275 X |
| 5,029,650 | 7/1991 | Smit | 172/272 X |

FOREIGN PATENT DOCUMENTS

| | | |
|---|---|---|
| 0126263 | 11/1984 | European Pat. Off. . |
| 0182091 | 5/1986 | European Pat. Off. . |
| 0274853 | 7/1988 | European Pat. Off. . |
| 2511574 | 2/1983 | France . |
| 2506745 | 8/1976 | Germany . |
| 3314684 | 10/1984 | Germany . |
| 3801895 | 8/1989 | Germany . |

Primary Examiner—Terry Lee Melius
Assistant Examiner—Victor Batson
Attorney, Agent, or Firm—Cushman Darby & Cushman, L.L.P.

[57] ABSTRACT

Lifting device (D) comprising a frame (4) for fixing to a tractor chassis, the frame being fitted, on its lower part, with lower securing member (A), articulated about a transverse axis and extending towards the front, with its ends capable of being coupled to the two lower fastening points of a tool, and on its higher part, with a median upper securing members (16); lifting members (14) are provided between the frame (4) and lower securing members. The lower securing members (A) comprise, firstly, a lower primary structure (19), articulated at its rear part on a transverse axis (18) carried by the frame (4), and provided on the front with two longitudinal lateral extensions (21) in which a transverse bearing (26) is provided, and secondly, a forearm (29) associated with each longitudinal extension 921) and articulated about an axis (34) carried by the bearing. The forearms are independent; each (29) when in a work position, comes to rest by means of its rear part, under a stop integral with the structure (19), so as to block itself on lifting of the structure or on load raising. When the forearm (29) is free of its load, it can be folded upwards in relation to the frame (4), for a storage position. The forearm is provided, in a high position of the frame (19), with a stationary locking device to prevent both the structure and forearms from dropping, and to prevent the latter from rotating in relation to said structure.

14 Claims, 3 Drawing Sheets

FRONT LIFTING DEVICE FOR AGRICULTURAL TRACTOR OR THE LIKE

FIELD OF THE INVENTION

The invention relates to a front lifting device, for an agricultural tractor or the like, making it possible to hitch a tool to the front of the tractor for the purpose of raising and/or lowering it, this device being of the sort of those which comprise a framework intended to be fixed to the chassis of the tractor, the said framework being equipped, at the bottom, with lower securing means, articulated about a transverse spindle extending forward and at the ends of which the bottom two fastening points of a tool can be fastened, and, at the top, with a middle upper securing means for connection with a third fastening point of the tool, and lifting means, particularly hydraulic ones, provided between the framework and the lower securing means in order to provide the ascending or descending movements, the lower securing means comprising, on the one hand, a primary lower structure articulated, at its rear part, to a transverse spindle carried by the framework, and equipped toward the front with two lateral longitudinal extensions in each of which is provided a transverse bearing and, on the other hand, a forearm associated with each longitudinal extension and articulated about a spindle carried by the abovementioned bearing, the assembly being such that in the working position the forearm extends the lateral extension forward, the said forearm extending, toward the rear, beyond its articulation spindle.

BACKGROUND OF THE INVENTION

A device of this type is known, especially from EP-A-0 182 091.

It is known that such a front lifting device allows the simultaneous use of at least two tools with an agricultural tractor, namely a pushed tool and a pulled tool. However, the development of front lifts runs into several difficulties which should be taken into account if one wishes to make their use more widespread.

A problem arises when the front lifting device is not used.

According to EP-A-0 182 091 the forearms may be placed and held in raised position, by the lifting means, in order to reduce the frontal space requirement of the front lifting device as far as possible. However, in the event of an erroneous maneuver of the lifting means by the operator, the latter may bring about the descent of the forearms when such a descent is not desired and may be troublesome, or even dangerous.

The invention aims, especially, to provide a lifting device which makes it possible to avoid the tiresome consequences in the event of actuation of the lifting means, while the forearms are raised and must remain so.

The lifting device may also constitute a hinderance, particularly if the operator wishes to mount a front loader at the front of his tractor. In such a case, the operator may have to remove the front lifting device beforehand, then install his front loader.

This operation of removing the front lift, for the period in which it is not being used, constitutes a troublesome constraint and a brake to the expansion of front lifting devices.

In addition, some tasks must be carried out alternately and are wholly incompatible with repeated mounting - removal operations.

EP-A-0 274 853 indeed does describe a lifting device allowing compatibility with a front loader. However, the design of this lifting device limits the ground clearance and turn radius when working. The turn radius is also limited in transport because, for folding on each side of the tractor a relatively wide lift device is required, which interferes with the wheels when they are turned.

SUMMARY OF THE INVENTION

The object of the invention, above all, is to provide a front lift device which no longer exhibits the drawbacks recalled hereinabove, or exhibits them to a lesser extent. It is desirable that when this front lifting device is in the storage position on the tractor it cannot be placed in the working position if the lifting means are actuated by mistake or accidentally. It is furthermore desirable that this device should not only be compatible with a front loader, but also that it also should not limit the handleability of the tractor. It is also desirable that such a front lifting device should not constitute an obstacle to the passage of a movement transmission from the front power take-off of the tractor.

It would be advantageous for the front lifting device to allow the tool to float freely if desired, as well as allowing adjustment of the inclination of the tool, or complete locking.

The fitting and adjustment of the front lifting device must be as simple and quick as possible.

According to the invention, a front lifting device for an agricultural tractor or the like making it possible to hitch a tool to the front of the tractor for the purpose of raising and lowering it, of the sort defined before, is characterized in that the lifting means are joined to the lower structure and to the framework, that the two forearms are independent, that each forearm comes to bear via its rear part, when it is in the working position, under a limit stop integral with the structure so as to be blocked during the lifting of the structure and the raising of a load, whereas when this forearm is devoid of any load, it may be folded upward, relative to the framework, for a storage position, and that a stationary locking of the forearms in the top position of the structure is provided in order at the same time to prevent the structure and the forearms from descending, and prevent the forearms from rotating relative to the structure.

Advantageously, the framework includes means for locking the forearms of the structure in the top position, by combination of the upward movement of the primary mobile lower structure, folding the forearms upward relative to the structure, and fastening the forearms to a support and locking member provided on the framework.

Preferably, the support and locking member is made up of a stub to which the end of the forearms is fastened.

As a variant, in order to lock the device when it is not in use the framework may include, at the top, bearings similar to those carried by the extensions of the lower structure, these bearings being equipped, when the assembly is in the working position, with auxiliary spindles similar to those of the forearms, equipped with prolongations longer than those of the forearms, the assembly being such that for locking of the forearms in the top position of the lower structure, the auxiliary spindles of the bearings of the framework are withdrawn from these bearings, whereas the forearms are removed from the extensions and turned round so as to be placed inside the framework with their spindles received in the top bearings of the framework, whereas the auxiliary spindles are mounted in the bearings of the lateral extensions with their prolongations pointed inward, the assembly being such that the ends of the forearms become fastened to the prolongations of the said auxiliary spindles when the lower structure is lifted.

Each lateral extension may comprise two members separated by a space in which there is received a joining member constituting one end of the lifting means, this member being joined to the extension by a spindle passing through openings provided in the members, whereas the bearing provided at the end of the lateral extension is made up of a bushing having a transverse axis.

The articulation spindle for each forearm may be fixed to the latter so that it can be inserted rapidly into the bearing of the corresponding extension, without tooling, the arm being situated outside the extension.

The spindle fixed to each forearm may include a prolongation of smaller diameter intended to be located between the extensions of the structure when the arm is mounted, it being possible for this prolongation to serve, if need be, for fastening accessories, particularly for fastening a weight holder.

Advantageously, the prolongation is equipped with means for stopping the spindle relative to the bearing, with possible interposition of washers, in the axial direction of this bearing.

The prolongation of each spindle has a reduced length so that there is enough space between the facing ends of the prolongations, when the two forearms are mounted, for the passage of a mechanical transmission from the front power take-off of the tractor.

Each forearm may include, toward its rear end, a peg orientated substantially orthogonally to the longitudinal direction of the forearm and situated beyond the articulation spindle of the forearm, this peg being capable of passing through an opening provided in a limit stop integral with the structure, and situated above the rear part of the forearm.

The peg receives a set of washers of variable thickness and is equipped with means for stopping the oscillation of the forearm so as to allow various possible settings for this forearm, namely oscillating, fixed, or with forced inclination.

The means for stopping the spindle of a forearm relative to the bearing may be set out so as to allow rapid unlocking of the forearm for the purpose of transverse sliding so that when the forearm is equipped at its end with a ball joint for the bore, it is possible, by transverse sliding, to bring the bore of this ball joint to face a stub carried by the framework in the top storage position, and, by sliding in the opposite direction, to engage the stub in the bore of the said ball joint in order to provide locking in the storage position.

The device may be set out so that the forearms, folded up in the storage position, have a substantially vertical front face fulfilling a shield function.

BRIEF DESCRIPTION OF THE DRAWINGS

The invention consists, apart from the provisions explained hereinabove, of a certain number of other provisions which will be dealt with more fully hereafter with regard to embodiment examples described with reference to the appended drawings, but which are in no way limiting.

Finally.

DETAILED DESCRIPTION OF THE INVENTION

Figure 1:
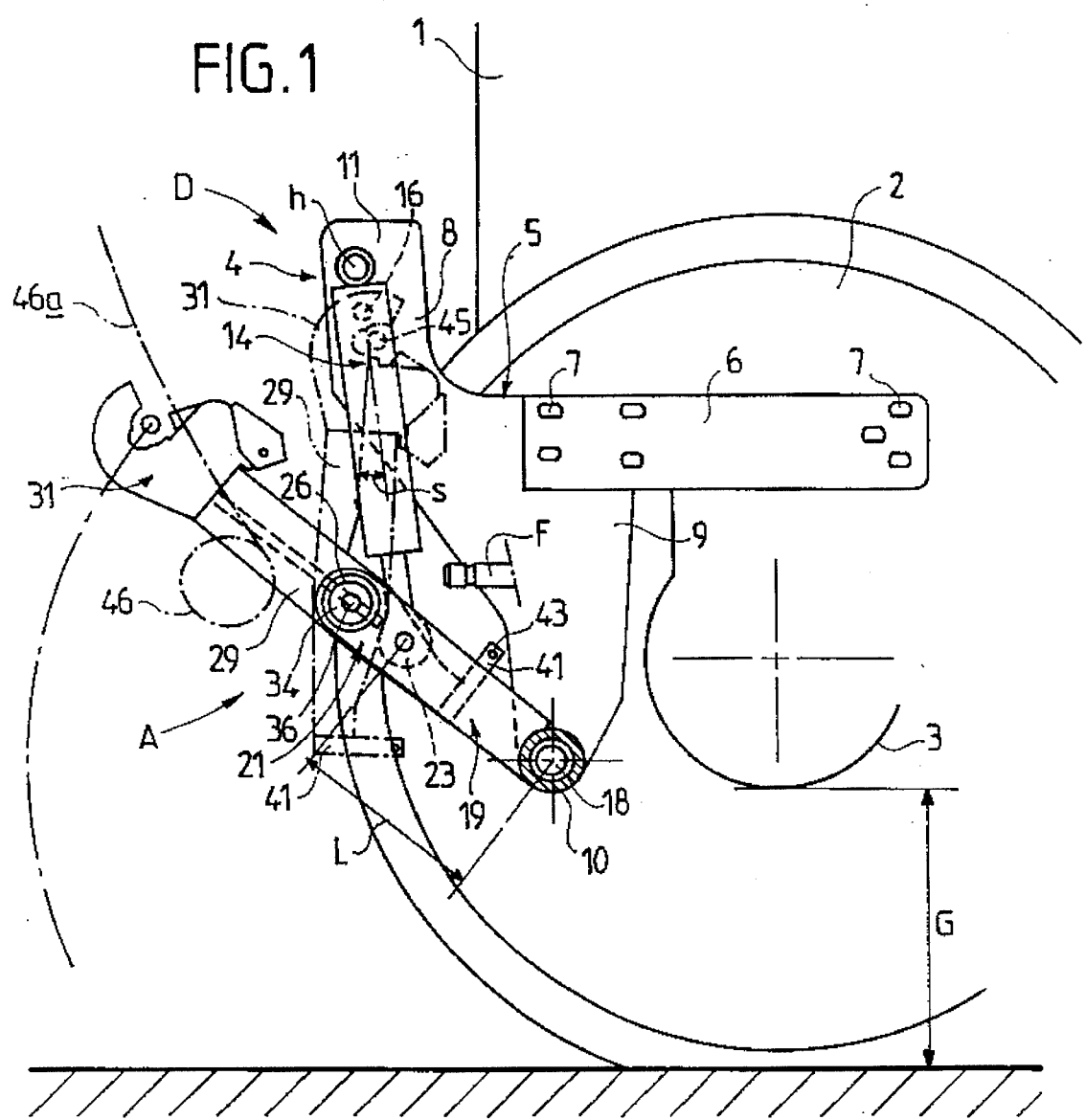
FIG. 1 of these drawings, is a side view in elevation of a hitching device according to the invention.
Figure 2:
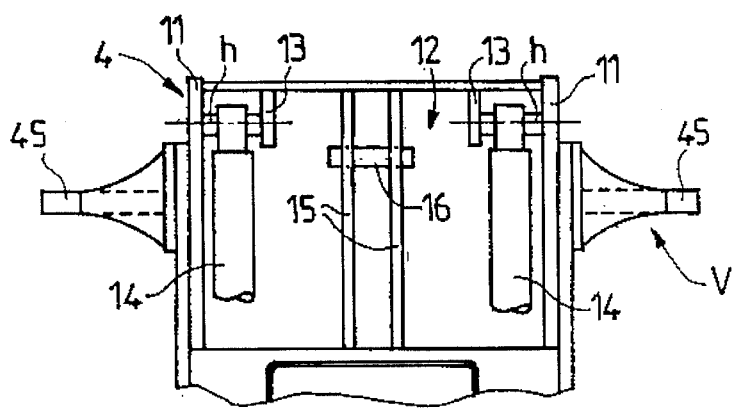
FIG. 2 is a partial view, from the left with respect to FIG. 1, of the framework.
Figure 3:
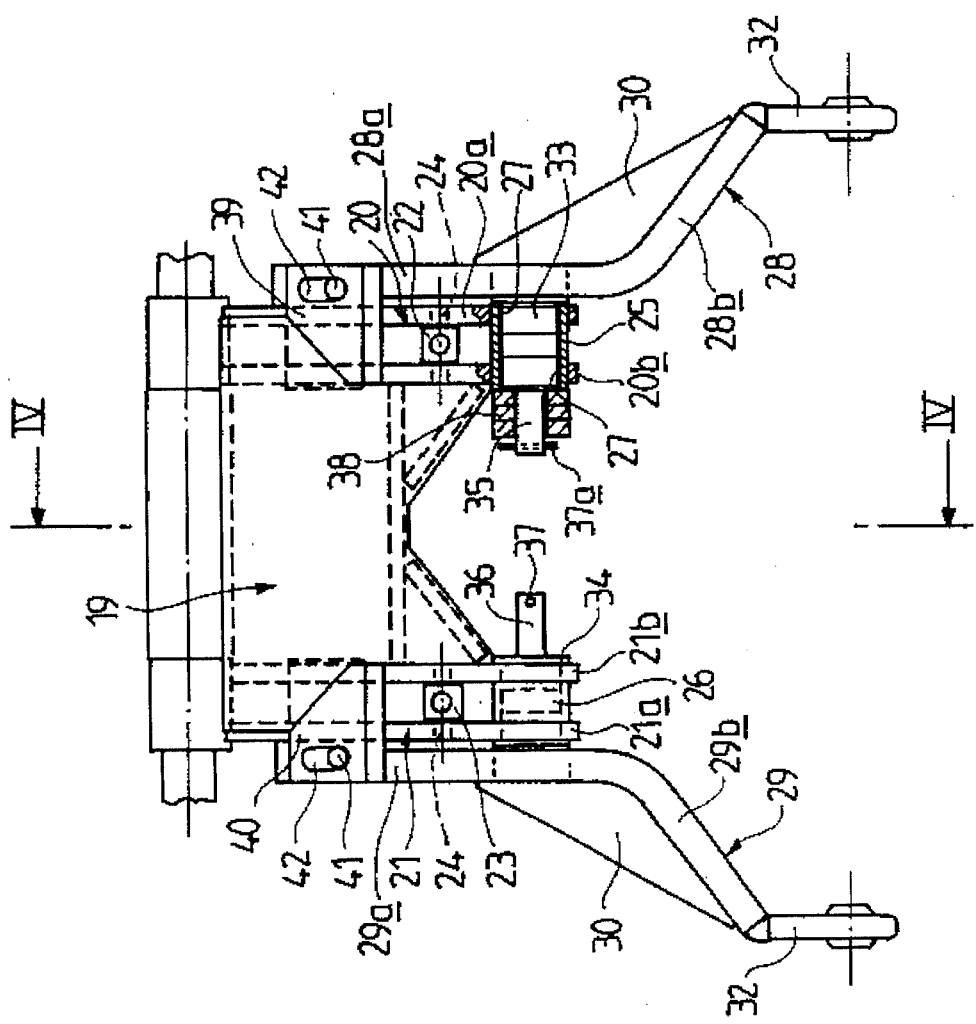
FIG. 3 is a plan view of the hitching device of FIG. 1.

Referring to the drawings, more particularly to FIGS. 1 to 3, it is possible to see a front lifting device D for an agricultural tractor 1 represented very roughly, a front wheel 2 of which is also roughly represented. The ground clearance G of the tractor 1 at the front corresponds to the distance between the ground and the lower most point of the outline 3 enveloping the lower parts of the front axle, or the like.

The device D comprises a framework 4 intended to be fixed to the chassis of the tractor 1. The framework 4 comprises two outer flanks such as 5 fixed respectively to the right and to the left of the chassis of the tractor between the front wheels. Each flank 5 comprises a rectangular plate 6 situated in a substantially vertical plane, the long dimension of which plate is horizontal, this plate including several holes 7 toward its front and rear ends for fixing to the chassis in a zone situated above the axis of the wheel 2. A bracket 8 projects upward at the front of the plate 6; this bracket 8 is especially made up of a vertical metal sheet substantially coplanar with the plate 6, welded to this plate. The bracket 8 includes a shank 9 extending downward and the lower end 10 of which is situated a distance from the ground which is greater than or equal to the distance G. The bracket 8 further includes an upright 11 extending to a level above the plate 6, forward.

A central part 12 of the framework gives a rigid connection between the top parts of the uprights 11. As visible in FIG. 2, toward the lateral ends of the central part, gusset plates 13 are fixed, especially by welding, a slight distance from the uprights 11. A hole is provided in the upright 11 and the neighboring gusset plate 13 to act as a support for a spindle h used for an articulated fixing of a hydraulic ram 14 constituting a lifting means, on each side. On either side of the plane which bisects the central part 12 there are provided small plates 15 including holes facing each other to act as support for a spindle 16 used to attach a top link bar such as the bar 17.

The framework 4 is equipped, at the bottom, with lower securing means A articulated about a transverse spindle 18 carried by bearings provided in the vicinity of the lower end 10 of the shanks 9. It is thus clear that the lower fastening point of the means A does not bring about a reduction in the ground clearance G of the tractor, or interfere with a front power take-off F. The bottom two lateral fastening points of a tool, not represented, are fastened in front of the securing means A.

The position in a horizontal plane of the spindle 18 for rotation of the shanks is chosen so that the lever arm L defined with respect to the position of the anchoring point of the rams 14 is enough for the diameter of the cylinder of the rams 14 to remain compatible with the space required to insert and extract the spindle 16 for fastening the top link.

The securing means A comprise a primary lower structure 19 articulated, at its rear part, to the transverse spindle 18. The structure 19 is equipped, toward the front, with two lateral longitudinal extensions 20, 21. Each lateral extension comprises two members 20a, 20b, 21a, 21b separated by a space in which a connecting member such as a ball joint 22, 23 mounted at the end of the rod of each lifting ram 14 is received. The ball joint 22, 23 is connected to the corresponding extension 20, 21 by a spindle passing through this clevis and received, at its ends, in holes 24 provided in each member.

In front of the holes 24, but at the smallest possible distance bearing in mind the space requirement of the ball joints 22, 23 and for the passage of the rod of the ram 14, there is provided a transverse bearing 25, 26 made up of a tubular bushing of transverse axis parallel to the spindle 18 for articulation of the structure 19. This bush 25, 26 is fixed, at 27, to these members, especially by welding. The bearings 25, 26 which are open allow wearing rings facilitating maintenance to be accommodated easily.

The lower securing means A comprise two forearms 28, 29 associated respectively with each lateral extension 20, 21. Each forearm is bent so that its front part moves away from the mean central direction, the concavity of the arm pointing outward. This makes it possible to obtain, between the front ends of the forearms, a distance which complies with hitching standards. A stiffening web 30, for example welded, is provided in the concavity of each arm. At the front end of each forearm there is fixed, by welding, either an automatically locking hand 31 (FIG. 1) open upward and allowing snap-fastening of a spindle by a simple vertical descending movement, or a device 32 with a ball joint having a closed bore into which a shaft is to be engaged in the axial direction of the bore in the ball joint.

An articulation spindle 33, 34 is fixed to the inside face of the respective forearms 28, 29 in a direction orthogonal to the forearm. This spindle 33, 34 has an outside diameter which is equal, to within the operating clearance, to that of the bore of the corresponding bearing 25, 26, so that it can be inserted rapidly from the outside, into the bearing, and be removed therefrom, without tooling.

Each spindle 33, 34 includes a prolongation of small diameter 35, 36 which is coaxial, intended to be located in the space lying between the extensions 20, 21 of the structure, when the forearm is mounted. Each prolongation 35, 36 is equipped, at its inner end, with a stop means made up, for example, of a diametral bore 37 capable of receiving a pin 37a which, combined with a spacer piece 38 engaged on the prolongation 35 and bearing against the inner face of the bearing 25 or 26, allows the corresponding forearm to be blocked transversely relatively to the structure 19, whilst leaving this forearm free to rotate about the axis of the bearing.

As explained later, the prolongations 35, 36 allow a weight holder to be fixed. The length of these prolongations 35, 36 is sufficient to ensure satisfactory fastening, but is not too great so that a gap remains between the inside ends facing each other of the prolongations 35, 36 to allow the passage of a transmission from the front power take-off F of the tractor.

Each forearm 28, 29 extends, rearward, beyond its articulation spindle 35, 36 as a branch 28a, 29a. The rear end of each branch 28a, 29a comes to bear under a limit stop 39, 40.

These limit stops 39, 40 may be made up of thick plates fixed under the structure 19, especially by welding, and extending laterally beyond the outline of this structure, above the rear ends of the forearms. During the lifting movement of the structure 19, if a load is fastened to the end of the forearms 28, 29, the latter become blocked in terms of rotation by the limit stops 39 and 40. In contrast, the forearms 28, 29 may be folded upward, the rear end of these forearms then moving away from the limit stops 39, 40.

It should be noted that the forearms 28, 29 are independent and can pivot differently, which allows a tool, carried by these arms, to effect a rotational movement about a plurality of longitudinal axes, for free floating allowing a relief to be followed.

Each forearm includes, toward its rear end, an upwardly pointing peg 41 substantially orthogonal to the longitudinal direction of the forearm. This peg 41, made for example of a piece of cylindrical rod, is capable of passing through an elongate opening 42 provided in the corresponding limit stop 39, 40. The peg 41 includes, toward its top end, a stop means advantageously made up of the combination of a diametral hole 43 and of a pin 43a engaged in this hole, in order to block or limit the possible oscillation of the forearm relative to the structure 19.

Adjustment is obtained by slipping washers 44 onto the peg 41. When all the washers are located above the limit stop 40, 41 and leave no vertical clearance between their upper face and the pin 43a, the forearm has no freedom of oscillation. In contrast, if a vertical clearance remains, the forearm retains a certain freedom of oscillation until the pin 43a comes into contact with the upper washer. It is equally well possible to place washers such as 44 beneath the limit stops 39, 40 so as to impose a forced inclination on the corresponding forearm.

As visible in FIG. 2, the framework 4 includes, at the top, means V for locking the lifting device in a top storage position, when this device is not being used. The locking position illustrated in chain line in FIG. 1 is obtained by combining the upward movement of the lower structure 19 and folding of the forearms 28, 29 upward relative to the structure 19 after any pins provided on the pegs 41 have been withdrawn. The locking means V comprise, projecting laterally on each side of the framework 4, at the top, a stub 45 fixed rigidly to the framework. This stub 45 may either be equipped with a ball used for fastening the tools and to which the automatic locking hand 31 becomes fastened, or engaged in the bore of the hand with ball joint 32, when the rams 14 are in the maximum lift position and the corresponding forearm is tilted upward.

The assembly is designed so that in this locking position, as visible in FIG. 1, the forearm 28, 29 is substantially vertical and constitutes a shield. Furthermore, the angle s formed between the axis of the ram 14 and the mean direction of the forearm 29 locked in the top position is relatively small, less than 30°. If, through carelessness, the operator should command the extension of the rod of the ram 14, the forearm essentially operates in tension; the locking is sufficient to withstand the effort generated by the rams 14.

The stationary locking in the top position according to the invention makes it possible both:

to prevent the structure 19 and forearms 28, 29 from descending;

to prevent the forearms from rotating relative to the structure.

These two functions fulfilled in a single operation make it possible to avoid errors.

The hydraulic distributor used for the operation of the rams 14 may be released, after the hydraulic tappings for connecting up the rams have been disconnected, for another use.

Figure 4:
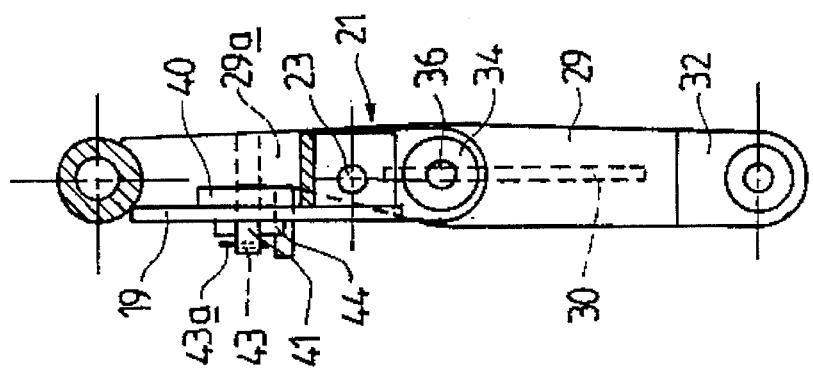
FIG. 4 is a section on the line IV—IV FIG. 3.

If the forearms are equipped with hands with ball joint 32 as illustrated in FIG. 2 instead of the automatic-locking hands of FIG. 4, it is necessary to proceed in the following manner to engage the locking stubs 45 in these ball joints.

The spindles 33, 34 are unlocked by withdrawing the pins 37a from the holes 37 and, after having removed the peg 41 from the openings 42, each forearm is pulled outward in order to move it away from the corresponding extension 20, 21. Under these conditions, when the arm is tilted upward, the ball joint 32 will be offset axially outward with respect to the stub 45 and its bore may be aligned with this stub. By pushing the forearm back against the associated extension, it is then possible to engage the stub 45 in the corresponding ball joint 32 and ensure locking of the lifting device in the top position, for storage.

The assembly is designed so that in the storage position represented in FIG. 1, the lifting device does not interfere with a front loader mounted on the front of the tractor, and only the rearmost element, namely a crossmember 46, of which is represented. The curve portion 46a represents part of the trajectory of the crossmember 46 during the movements of the front loader, this curve 46a in some way constituting the limit with which the lifting device must not interfere in order to leave the movements of the front loader unimpeded.

The rams 14 may operate as dual-acting rams.

The operation and use of the lifting device result immediately from the foregoing explanations.

When this device is in the working position, the foreams 28, 29 prolong the lateral extensions and the pegs 41 are engaged in the openings 42. Depending on the adjustment adopted, the foreams may be immobilized in terms of rotation relative to the structure 19 by a set of washers 44 of sufficient thickness, or may retain a certain freedom in oscillation allowing the relief to be followed. The ascending or descending movements of the tool are commanded by the rams 14.

For putting into the storage position, when the forearms have been released from the tool, the user, from the cab of the tractor, commands the placing of the structure 19 in the extreme top position, by causing the rod of the rams 14 to retract into the corresponding cylinders as fully as possible.

The operator may then, on the ground, unlock each peg 41 in succession and tilt the corresponding forearm upward until it locks on a stub 45 in a substantially vertical position.

The operations are facilitated by the fact that just one forearm has to be manipulated, in succession.

It will be noted that the outwardly bent front ends 28b, 29b of the forearms 28, 29 make it possible to substantially reduce the transverse dimension of the structure 19 whilst retaining the conventional width at the fastening hands 31, 32.

When the arms are in the working position, the bent parts 28b, 29b are relatively forward and the risk of interference with the wheels such as 2 of the tractor, when turning, are non-existent.

In contrast, for some configurations, it is possible that in the raised storage position, the bent parts 28b, 29b of the forearms may be capable of interfering with the guiding wheels if the arms remain outside the framework 4, as for the embodiment of FIGS. 1 to 4.

Figure 5:
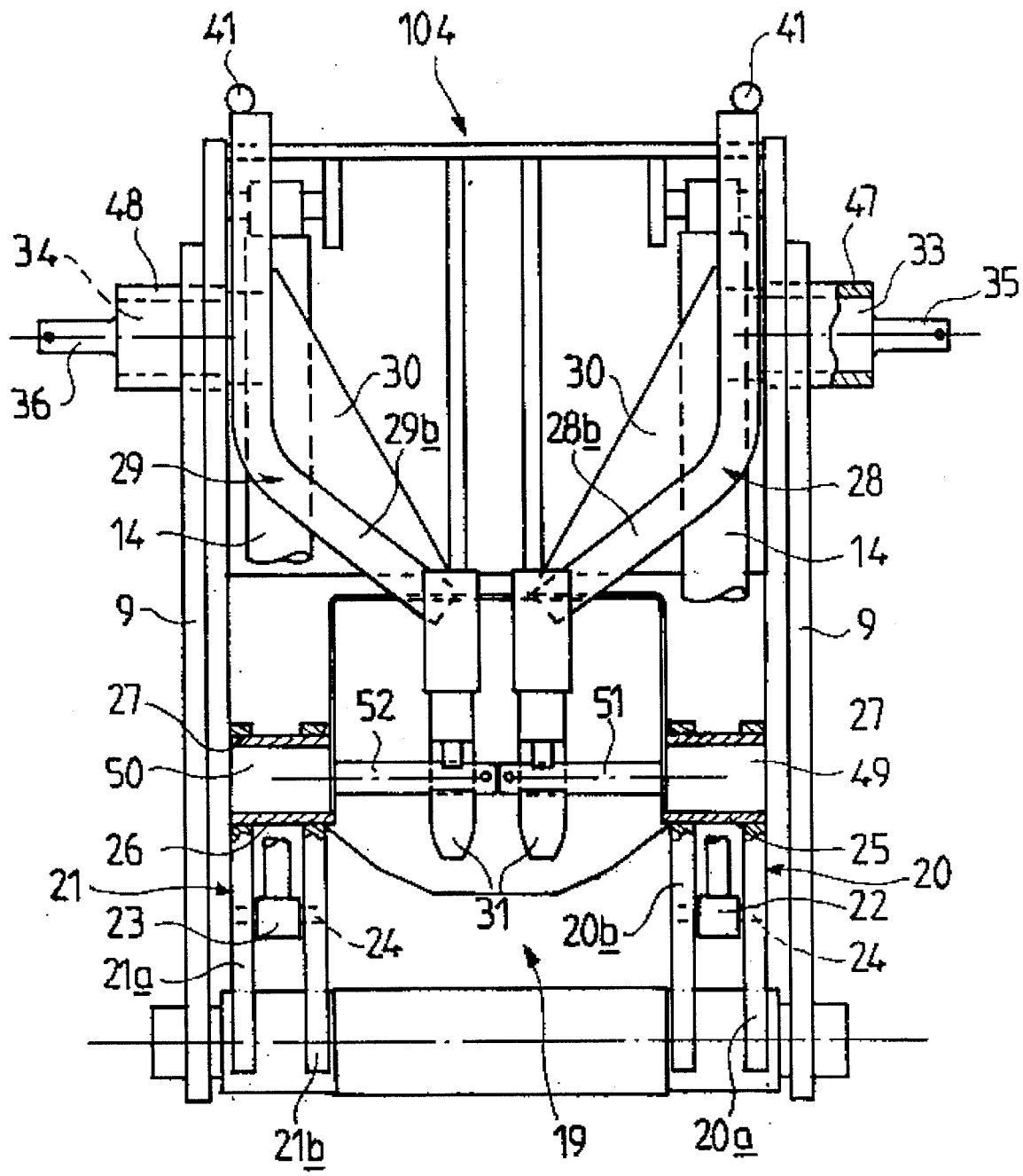
FIG. 5 is a partial, front-on view of a variant embodiment of the front hitching device, in the storage position.

In order to avoid such a problem, there is provided, as illustrated in FIG. 5, a framework 104 equipped, at the top, on each side, with transverse bearings 47, 48 similar to the bearings 25 and 26 of FIG. 2, so that the spindles 33, 34 can be inserted into these bearings 47, 48 when desired.

Auxiliary spindles 49, 50 are normally housed in these bearings 47, 48. These spindles include coaxial prolongations 51, 52 of smaller diameter, equal to that of the prolongations 35, 36. When the lifting device is in the working position, the auxiliary spindles 49, 50 are carried by the bearings 47, 48 and the prolongations 51, 52 project outward.

In contrast, in the storage position illustrated in FIG. 5, the spindles 49, 50 have been extracted from the bearings 47, 48 to be mounted in the bearings 25, 26. The prolongations 51, 52 are longer than the prolongations 35, 36 so that when the spindles 49, 50 are mounted in the bearings 25, 26 in place of the spindles 33, 34, the inside ends of the prolongations 51, 52 are close to one another without being in contact. The lower structure 19 and the forearms are identical to those described with reference to the preceding figures.

When the operator wishes to place the lifting device in the storage position, he removes the forearms 28, 29 relative to the structure by disengaging the pins from the prolongations 35 and 36 and extracting the spindles from the bearings 25, 26.

The operator then extracts the spindles 49, 50 from the bearings 47 and 48, which are thus free.

The operator then causes the forearms 28, 29 to undergo a turning-round through 180° about a substantially vertical axis so that the concavity of each bent forearm points inward.

The operator places the forearm 28 inside the framework 104 by engaging the spindle 33 into the bearing 47, the end of the forearm 28 equipped with the hand 31 pointing downward (see FIG. 5).

The operator acts in the same way for the arm 29, the spindle 34 of which is inserted into the bearing 48 (FIG. 5).

The hands of the forearms are close to one another.

The operator then commands the raising of the structure 19 into the extreme top position. The bearings 25 and 26 are thus brought even with the hands of the forearms 28, 29.

In order to lock these hands, the operator inserts into the bearings 25, 26 in the top position, the auxiliary spindles 49, 50 with their prolongations 51, 52, pointing toward the longitudinal mid-plane of the framework.

In the case of hands 32 with a ball joint, the prolongations 51, 52 are engaged in the bores of these ball joints by means of the translational movement.

In the case of hands 31 with automatic locking, first of all the auxiliary spindles 49, 50 may be fitted into the raised bearings 25, 26, then the hands 31 may be locked onto the corresponding prolongation 51, 52 by a pivoting movement of the forearm around the bearing 49 or 50.

In this storage position of the lifting device all the advantages described with reference to the preceding figures may again be seen; furthermore, the transverse size requirement is reduced to a minimum since the forearms 28, 29 are located between the lateral parts of the framework, so that the risks of interference with the front wheels of the tractor, during turning, are eliminated.

I claim:

1. Front lifting device, for an agricultural implement of the type having a chassis and a front, for hitching a tool to the front of the implement to be raised or lowered, comprising:

a framework for attachment to the chassis and having a bottom having a transverse axis and lower securing means articulated about said transverse axis, said lower securing means extending forwardly relative to the front of the implement and having ends for attachment of a first and a second attachment point of a tool;

said framework having a top to which is attached a middle upper securing means for connection with a third attachment point of the tool, hydraulic lifting means operable between said framework and said lower securing means to effect raising and lowering movements, said lower securing means including a primary lower structure having a rear part articulated on a transverse spindle coextending with said transverse axis and carried on said framework, said primary lower structure having a forward part including two lateral extensions each having a transverse bearing, a forearm associated with each lateral extension, an articulation spindle carried in each said bearing, each forearm having a forward and rear end and, intermediate said forward and rear ends, being articulated on a said respective articulation spindle carried in a said respective transverse bearing such that said rear end extends beyond said articulation spindle;

each said hydraulic lifting means being joined to said primary lower structure and to said framework, said rear ends of said forearms bearing against a limit stop provided on said primary lower structure so as to be engaged with said limit stop during lifting of said primary lower structure and raising of a load while, when free of a load, each said forearm is movable independently of the other forearm about said articulation spindle to a folded, storage position, for locking on said framework and to prevent said primary lower structure and said forearms from rotating relative to said primary lower structure.

2. The device as claimed in claim 1 wherein said framework includes locking means for locking each said forearm in the storage position, said locking means comprising a support and locking member provided on said framework.

3. Device according to claim 2, characterized in that the support and locking member comprises a stub.

4. Front lifting device, for an agricultural implement of the type having a chassis and a front, for hitching a tool to the front of the implement to be raised or lowered, comprising:

a framework for attachment to the chassis and having a bottom having a transverse axis and lower securing means articulated about said transverse axis, said lower securing means extending forwardly relative to the front of the implement and having ends for attachment of a first and a second attachment point of a tool;

said framework having a top to which is attached a middle upper securing means for connection with a third attachment point of the tool, a pair of hydraulic lifting means operable between said framework and said lower securing means to effect raising and lowering movements, said lower securing means including a primary lower structure having a rear part articulated on a transverse spindle coextending with said transverse axis and carried on said framework, said primary lower structure having a forward part including two lateral extensions each having a transverse bearing, a forearm associated with each lateral extension, an articulation spindle carried in each said bearing, each forearm having a forward and rear end and, intermediate said forward and rear ends, being articulated on a said respective articulation spindle carried in a said respective transverse bearing such that said rear end extends beyond said articulation spindle;

each said hydraulic lifting means being joined to said primary lower structure and to said framework, said rear ends of said forearms bearing under and against a limit stop provided on said primary lower structure so as to engaged with said limit stop during lifting of said primary lower structure and raising of a load while, when free of a load, each said forearm is movable independently of the other forearm about said articulation spindle to a folded, storage position, for locking on said framework and prevent said primary lower structure and said forearms from rotating relative to said primary lower structure;

said framework including at said top thereof a pair of bearings each including an auxiliary spindle having a selected length and another pair of auxiliary spindles being provided at the bottom of said framework, said another pair of auxiliary spindles each having prolongations extending beyond said selected length of said auxiliary spindles so that said forward end of each forearm can be locked on a said prolongation of one of said another pair of auxiliary spindles in a storage position with said forearms disposed in said framework with said auxiliary spindles positioned in a said respective bearing at said top of said framework and in apertures provided in said forearms.

5. The invention as claimed in claims 1 or 4 wherein each lateral extension of said primary lower structure comprises two members separated by a space in which there is received a joining member constituting one end of said lifting means, each said joining member being joined to a said lateral extension by a spindle passing through openings provided in each said member, said bearing provided at the end of each lateral extension being a bushing having a transverse axis.

6. The invention as claimed in claim 5 wherein said articulation spindle for each forearm is fixed to each forearm so that said articulation spindle can be inserted rapidly into a said bearing of the corresponding lateral extension with said respective forearm being situated outside said respective lateral extension.

7. The invention as claimed in claim 6 wherein said articulation spindle fixed to each forearm includes a prolongation of smaller diameter than the diameter of said articulation spindle for insertion between said lateral extensions of said primary lower structure when said forearm is mounted on said framework.

8. The invention as claimed in claim 7 wherein each prolongation is provided with means for retaining the articulation spindle in a selected position relative to the bearing, said means comprising washers.

9. The invention as claimed in claim 8 wherein said means for stopping the articulation spindle of a said forearm relative to said associated bearing are positioned to allow rapid unlocking of said respective forearm to allow transverse sliding of said forearm on said articulation spindle, said forearm being equipped at said forward end with a ball joint which is positioned to cooperate with a stub carried by said framework at said top thereof in the storage position, said respective forearm being transversely slidable to engage said stub in the bore of said ball joint to provide locking in the storage position.

10. The invention as claimed in claim 7 wherein said prolongation of each spindle has a reduced length to provide sufficient space between the facing ends of the prolongations for the passage of a mechanical transmission from the front power take-off of the agricultural implement.

11. The invention as claimed in claims 1 or 4 wherein each forearm includes an upper part and, adjacent its rear end, a peg oriented substantially orthogonally to the associated forearm and situated between said articulation spindle of said respective forearm and said rear end thereof, said peg passing through an opening provided in a limit stop provided on said framework and located on said upper part of said forearm.

12. The invention as claimed in claim 11 wherein said peg is provided with a set of washers of selected thickness and includes means for preventing oscillation of said respective forearm and for permitting selected positionings of each said forearm.

13. The invention as claimed in claims 1 or 4 wherein said forearms are provided with a front face which, when in the storage position, provides a substantially vertical shield.

14. Front lifting device, for an agricultural implement of the type having a chassis and a front, for hitching a tool to the front of the implement to be raised or lowered, comprising:

- a framework for attachment to the chassis and having a bottom having a transverse axis and lower securing means articulated about said transverse axis, said lower securing means extending forwardly relative to the front of the implement and having ends for attachment of a first and a second attachment point of a tool;
- said framework having a top to which is attached a middle upper securing means for connection with a third attachment point of the tool,
- a pair of hydraulic lifting means operable between said framework and said lower securing means to effect raising and lowering movements,
- said lower securing means including a primary lower structure having a rear part articulated on a transverse spindle coextending with said transverse axis and carried on said framework, said primary lower structure having a forward part including two lateral extensions each having a transverse bearing, a forearm associated with each lateral extension, an articulation spindle carried in each said bearing, each forearm having a forward and rear end and, intermediate said forward and rear ends, being articulated on a said respective articulation spindle carried in a said respective transverse bearing such that said rear end extends beyond said articulation spindle;
- each said hydraulic lifting means being joined to said primary lower structure and to said framework, said rear ends of said forearms bearing under and against a limit stop provided on said primary lower structure so as to engaged with said limit stop during lifting of said primary lower structure and raising of a load while, when free of a load, each said forearm is movable independently of the other forearm about said articulation spindle to a folded, storage position, for locking on said framework and prevent said primary lower structure and said forearms from rotating relative to said primary lower structure;
- said framework including locking means for locking each said forearm in the storage position, said locking means comprising a support and locking stub provided on said framework, said forward end of each said forearm being fastened on said respective stub.

* * * * *